United States Patent
Su et al.

(10) Patent No.: US 11,363,302 B2
(45) Date of Patent: Jun. 14, 2022

(54) METHOD AND APPARATUS OF NEURAL NETWORK FOR VIDEO CODING

(71) Applicant: MEDIATEK INC., Hsinchu (TW)

(72) Inventors: Yu-Chi Su, Hsinchu (TW); Jan Klopp, Hsinchu (TW); Ching-Yeh Chen, Hsinchu (TW); Tzu-Der Chuang, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/646,624

(22) PCT Filed: Sep. 28, 2018

(86) PCT No.: PCT/CN2018/108212
§ 371 (c)(1),
(2) Date: Mar. 12, 2020

(87) PCT Pub. No.: WO2019/072097
PCT Pub. Date: Apr. 18, 2019

(65) Prior Publication Data
US 2020/0252654 A1    Aug. 6, 2020

Related U.S. Application Data

(60) Provisional application No. 62/588,493, filed on Nov. 20, 2017, provisional application No. 62/571,352, (Continued)

(51) Int. Cl.
*G06T 9/00* (2006.01)
*H04N 19/86* (2014.01)
(Continued)

(52) U.S. Cl.
CPC .......... *H04N 19/86* (2014.11); *H04N 19/107* (2014.11); *H04N 19/176* (2014.11); *H04N 19/186* (2014.11); *H04N 19/33* (2014.11)

(58) Field of Classification Search
CPC .... H04N 19/86; H04N 19/107; H04N 19/176; H04N 19/186; H04N 19/33
See application file for complete search history.

(56) References Cited

U.S. PATENT DOCUMENTS 5,638,125 A    6/1997   Jeong et al.
6,885,320 B2   4/2005   Kim
(Continued)

FOREIGN PATENT DOCUMENTS

CN    1124434 A    6/1996
CN    1525761 A    9/2004
(Continued)

OTHER PUBLICATIONS

International Search Report and Written Opinion dated Jan. 4, 2019, issued in application No. PCT/CN2018/108212.
(Continued)

*Primary Examiner* — Hesham K Abouzahra
(74) *Attorney, Agent, or Firm* — Oblon, McClelland, Maier & Neustadt, L.L.P.

(57) ABSTRACT

Method and apparatus of video encoding video coding for a video encoder or decoder using Neural Network (NN) are disclosed. According to one method, input data or a video bitstream are received for blocks in one or more pictures, which comprise one or more colour components. The residual data, prediction data, reconstructed data, filtered-reconstructed data or a combination thereof is derived for one or more blocks of said one or more pictures. A target signal corresponding to one or more of the about signal types is processed using a NN (Neural Network) and the input of
(Continued)

the NN or an output of the NN comprises two or more colour components. According to another method, A target signal corresponding to one or more of the about signal types is processed using a NN and the input of the NN or an output of the NN comprises two or more colour components.

18 Claims, 8 Drawing Sheets

Related U.S. Application Data filed on Oct. 12, 2017, provisional application No. 62/571,347, filed on Oct. 12, 2017, provisional application No. 62/571,350, filed on Oct. 12, 2017.

(51) Int. Cl.
*H04N 19/107* (2014.01)
*H04N 19/176* (2014.01)
*H04N 19/186* (2014.01)
*H04N 19/33* (2014.01)

(56) References Cited

U.S. PATENT DOCUMENTS

| 9,729,893 | B2 | 8/2017 | Lee et al. |
| 2002/0184272 | A1 | 12/2002 | Burges et al. |
| 2006/0251330 | A1* | 11/2006 | Toth ........................ G06N 3/084 382/236 |
| 2017/0359586 | A1* | 12/2017 | Xue ........................ H04N 19/17 |
| 2018/0184123 | A1 | 6/2018 | Terada et al. |
| 2019/0342545 | A1* | 11/2019 | Yoo ........................ H04N 19/59 |
| 2020/0120340 | A1* | 4/2020 | Park ........................ H04N 19/82 |
| 2020/0244997 | A1* | 7/2020 | Galpin ...................... H04N 19/82 |

FOREIGN PATENT DOCUMENTS

| CN | 1857001 A | 11/2006 |
| CN | 104067613 A | 9/2014 |
| CN | 104754357 A | 7/2015 |
| WO | WO 2016/199330 A1 | 12/2016 |
| WO | 2017/036370 A1 | 3/2017 |

OTHER PUBLICATIONS

Office Action dated Mar. 29, 2021 in Chinese Application No. 201880060786.2.

Supplementary European Search Report dated Jun. 24, 2021 in Application No. 18865453.7.

* cited by examiner

METHOD AND APPARATUS OF NEURAL NETWORK FOR VIDEO CODING

CROSS REFERENCE TO RELATED PATENT APPLICATION(S)

The present invention claims priority to U.S. Provisional Patent Application, Ser. No. 62/571,347, filed on Oct. 12, 2017, U.S. Provisional Patent Application, Ser. No. 62/571,350, filed on Oct. 12, 2017, U.S. Provisional Patent Application, Ser. No. 62/571,352, filed on Oct. 12, 2017 and U.S. Provisional Patent Application, Ser. No. 62/588,493, filed on Nov. 20, 2017. The U.S. Provisional Patent Applications are hereby incorporated by reference in their entireties.

TECHNICAL FIELD

The invention relates generally to video coding. In particular, the present invention relates to apply Neural Network (NN) in the coding system to one or more target signals, where the target signal(s) provided to NN input corresponds to the reconstructed residual, output from the prediction process, the reconstruction process or said at least one filtering process, or any combination of them.

BACKGROUND

Neural Network (NN), also referred as an 'Artificial' Neural Network (ANN), is an information-processing system that has certain performance characteristics in common with biological neural networks. A Neural Network system is made up of a number of simple and highly interconnected processing elements to process information by their dynamic state response to external inputs. The processing element can be considered as a neuron in the human brain, where each perceptron accepts multiple inputs and computes weighted sum of the inputs. In the field of neural network, the perceptron is considered as a mathematical model of a biological neuron. Furthermore, these interconnected processing elements are often organized in layers. For recognition applications, the external inputs may correspond to patterns are presented to the network, which communicates to one or more middle layers, also called 'hidden layers', where the actual processing is done via a system of weighted 'connections'.

Artificial neural networks may use different architecture to specify what variables are involved in the network and their topological relationships. For example the variables involved in a neural network might be the weights of the connections between the neurons, along with activities of the neurons. Feed-forward network is a type of neural network topology, where nodes in each layer are fed to the next stage and there is connection among nodes in the same layer. Most ANNs contain some form of 'learning rule', which modifies the weights of the connections according to the input patterns that it is presented with. In a sense, ANNs learn by example as do their biological counterparts. Backward propagation neural network is a more advanced neural network that allows backwards error propagation of weight adjustments. Consequently, the backward propagation neural network is capable of improving performance by minimizing the errors being fed backwards to the neural network.

The NN can be a deep neural network (DNN), convolutional neural network (CNN), recurrent neural network (RNN), or other NN variations. Deep multi-layer neural networks or deep neural networks (DNN) correspond to neural networks having many levels of interconnected nodes allowing them to compactly represent highly non-linear and highly-varying functions. Nevertheless, the computational complexity for DNN grows rapidly along with the number of nodes associated with the large number of layers.

The CNN is a class of feed-forward artificial neural networks that is most commonly used for analysing visual imagery. A recurrent neural network (RNN) is a class of artificial neural network where connections between nodes form a directed graph along a sequence. Unlike feedforward neural networks, RNNs can use their internal state (memory) to process sequences of inputs. The RNN may have loops in them so as to allow information to persist. The RNN allows operating over sequences of vectors, such as sequences in the input, the output, or both.

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). The CTU is further partitioned into multiple coding units (CUs) to adapt to various local characteristics. HEVC supports multiple Intra prediction modes and for Intra coded CU, the selected Intra prediction mode is signalled. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. After prediction, the residues associated with the CU are partitioned into transform blocks, named transform units (TUs) for the transform process.

FIG. 1A illustrates an exemplary adaptive Intra/Inter video encoder based on HEVC. The Intra/Inter Prediction unit 110 generates Inter prediction based on Motion Estimation (ME)/Motion Compensation (MC) when Inter mode is used. The Intra/Inter Prediction unit 110 generates Intra prediction when Intra mode is used. The Intra/Inter prediction data (i.e., the Intra/Inter prediction signal) is supplied to the subtractor 116 to form prediction errors, also called residues or residual, by subtracting the Intra/Inter prediction signal from the signal associated with the input picture. The process of generating the Intra/Inter prediction data is referred as the prediction process in this disclosure. The prediction error (i.e., residual) is then processed by Transform (T) followed by Quantization (Q) (T+Q, 120). The transformed and quantized residues are then coded by Entropy coding unit 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Since a reconstructed picture may be used as a reference picture for Inter prediction, a reference picture or pictures have to be reconstructed at the encoder end as well. Consequently, the transformed and quantized residues are processed by Inverse Quantization (IQ) and Inverse Transformation (IT) (IQ+IT, 124) to recover the residues. The reconstructed residues are then added back to Intra/Inter prediction data at Reconstruction unit (REC) 128 to reconstruct video data. The process of adding the reconstructed residual to the Intra/Inter prediction signal is referred as the reconstruction process in this disclosure. The output picture from the reconstruction process is referred as the reconstructed picture. In order to reduce artefacts in the reconstructed picture, in-loop filters including Deblocking Filter (DF) 130 and Sample Adaptive Offset (SAO) 132 are used. The filtered reconstructed picture at the output of all filtering processes is referred as a decoded picture in this disclosure. The decoded pictures are stored in Frame Buffer 140 and used for prediction of other frames.

FIG. 1B illustrates an exemplary adaptive Intra/Inter video decoder based on HEVC. Since the encoder also contains a local decoder for reconstructing the video data, some decoder components are already used in the encoder except for the entropy decoder. At the decoder side, an Entropy Decoding unit 160 is used to recover coded symbols or syntaxes from the bitstream. The process of generating the reconstructed residual from the input bitstream is referred as a residual decoding process in this disclosure. The prediction process for generating the Intra/Inter prediction data is also applied at the decoder side, however, the Intra/Inter prediction unit 150 is different from that in the encoder side since the Inter prediction only needs to perform motion compensation using motion information derived from the bitstream. Furthermore, an Adder 114 is used to add the reconstructed residues to the Intra/Inter prediction data.

During the development of the HEVC standard, another in-loop filter, called Adaptive Loop Filter (ALF), is also disclosed, but not adopted into the main standard. The ALF can be used to further improve the video quality. For example, ALF 210 can be used after SAO 132 and the output from ALF 210 is stored in the Frame Buffer 140 as shown in FIG. 2A for the encoder side and FIG. 2B at the decoder side. For the decoder side, the output from the ALF 210 can also be used as decoder output for display or other processing. In this disclosure, deblocking filter, SAO and ALF are all referred as a filtering process.

Among different image restoration or processing methods, neural network based method, such as deep neural network (DNN) or convolution neural network (CNN), is a promising method in the recent years. It has been applied to various image processing applications such as image de-noising, image super-resolution, etc., and it has been proved that DNN or CNN can achieve a better performance compared to traditional image processing methods. Therefore, in the following, we propose to utilize CNN as one image restoration method in one video coding system to improve the subjective quality or coding efficiency. It is desirable to utilize NN as an image restoration method in a video coding system to improve the subjective quality or coding efficiency for emerging new video coding standards such as High Efficiency Video Coding (HEVC).

SUMMARY

A method and apparatus of video encoding video coding for a video encoder or decoder using Neural Network (NN) are disclosed. According to this method, input data at an encoder side or a video bitstream at a decoder side is received, where the input data comprise one or more pictures in a video sequence or the video bitstream comprises compressed data associated with said one or more pictures in the video sequence, and wherein each picture comprises one or more colour components. The residual data, prediction data, reconstructed data, filtered-reconstructed data or a combination thereof is derived for one or more blocks of said one or more pictures. A target signal is processed using a NN (Neural Network), where the target signal provided to an input of the NN corresponds to the residual data, the prediction data, the reconstructed data, the filtered-reconstructed data or the combination thereof, and wherein the input of the NN or an output of the NN comprises two or more colour components.

In the above method, the colour components may correspond to two chroma components or a luma component and two chroma components. In one embodiment, the NN is designed for processing a luma component and the input of the NN comprises one or more blocks of the luma component and corresponding one or more blocks of a chroma component. The chroma component may be up-sampled to match a sampling rate of the luma component. In another embodiment, the NN is designed for processing a chroma component and the input of the NN comprises one or more blocks of the chroma component and corresponding one or more blocks of a luma component. The luma component may be down-sampled to match a sampling rate of the chroma component.

In the above method, the NN may correspond to CNN (convolutional neural network), DNN (deep fully-connected feed-forward neural network), RNN (recurrent neural network), or GAN (generative adversarial network). When outputs of the NN include two or more colour components, control flags for enabling or disabling the NN for individual colour components can be combined or shared for said two or more colour components.

According to another method, input data at an encoder side or a video bitstream at a decoder side is received, where the input data comprise one or more pictures in a video sequence or the video bitstream comprises compressed data associated with said one or more pictures in the video sequence. The residual data, prediction data, reconstructed data, filtered-reconstructed data or a combination thereof is derived for one or more blocks of said one or more pictures. A target signal is processed using a NN (Neural Network), where the target signal corresponds to the residual data, the prediction data, the reconstructed data, the filtered-reconstructed data or the combination thereof, and at least one of said one or more blocks of said one or more pictures is used to derive multiple sub-blocks and the multiple sub-blocks are provided as an input of the NN.

For the second method, subsampling can be applied to at least one of said one or more blocks of said one or more pictures to derive the multiple sub-blocks and the multiple sub-blocks correspond to different phases associated with the subsampling.

In one embodiment of the second method, the NN is designed for processing a luma component and the input of the NN comprises one or more blocks of the luma component and corresponding one or more blocks of a chroma component. The chroma component may be up-sampled to match a sampling rate of the luma component. In another example, one or more blocks of the luma component can be used to derive the multiple sub-blocks to be inputted to the NN, and the output of the NN comprises multiple output-sub-blocks of the luma component.

In one embodiment of the second method, the NN is designed for processing more than one component. The input of the NN comprises data associated with the luma component and corresponding data associated with the chroma component, in which one or more blocks of the luma component can be used to derive the multiple sub-blocks to be inputted to the NN. The output of the NN comprises multiple output-sub-blocks of the luma component and one or more output blocks of the chroma component.

In another embodiment, the NN is designed for processing a chroma component and the input of the NN comprises one or more blocks of the chroma component and corresponding one or more blocks of a luma component. The luma component may be down-sampled to match a sampling rate of the chroma component.

In one embodiment of the second method, the input of the NN comprises one or more blocks of a first-type signal and a second-type signal selected from a group including the residual data, the prediction data, the reconstructed data and the filtered-reconstructed data, and wherein said one or more blocks of the first-type signal and the second-type signal are used to derive the multiple sub-blocks. In another embodiment of the second method, the input of the NN comprises one or more blocks of a first-type signal and a second-type signal selected from a group including the residual data, the prediction data, the reconstructed data and the filtered-reconstructed data, and wherein only said one or more blocks of the first-type signal or the second-type signal are used to derive the multiple sub-blocks.

For the second method, the NN may correspond to CNN (convolutional neural network), DNN (deep fully-connected feed-forward neural network), RNN (recurrent neural network), or GAN (generative adversarial network). When outputs of the NN include two or more colour components, control flags for enabling or disabling the NN for individual colour components can be combined or shared for said two or more colour components.

DETAILED DESCRIPTION OF PREFERRED IMPLEMENTATIONS

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
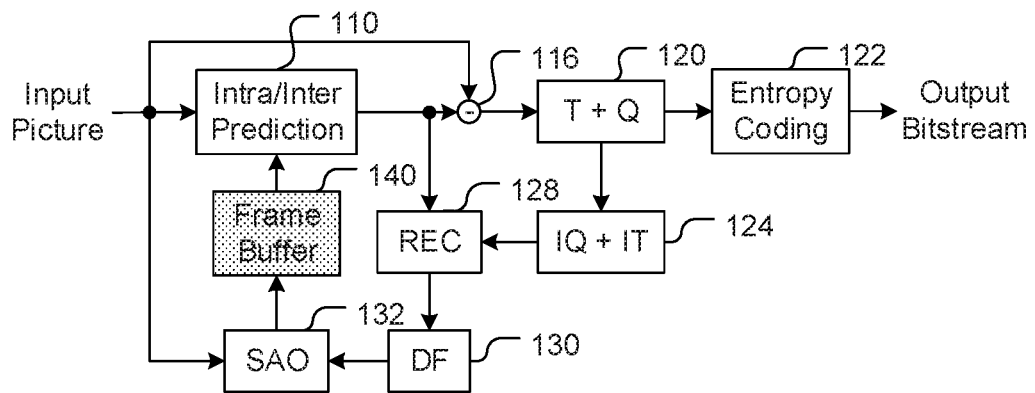
FIG. 1A illustrates an exemplary adaptive Intra/Inter video encoder based on the High Efficiency Video Coding (HEVC) standard.
Figure 1B:
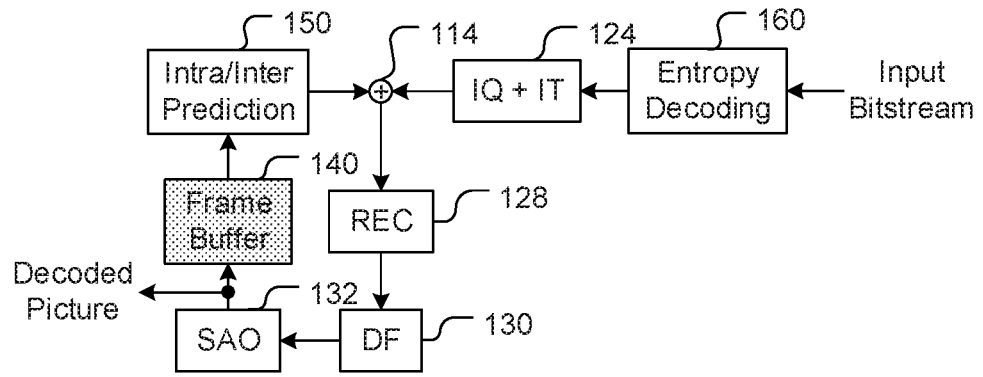
FIG. 1B illustrates an exemplary adaptive Intra/Inter video decoder based on the High Efficiency Video Coding (HEVC) standard.
Figure 2A:
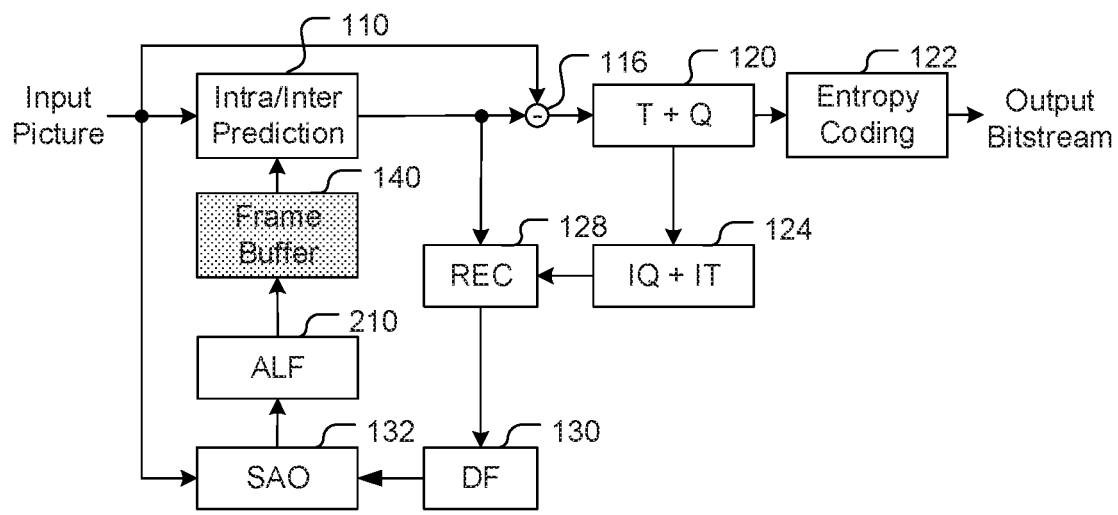
FIG. 2A illustrates an exemplary adaptive Intra/Inter video encoder similar to that in FIG. 1A with an additional ALF process.
Figure 2B:
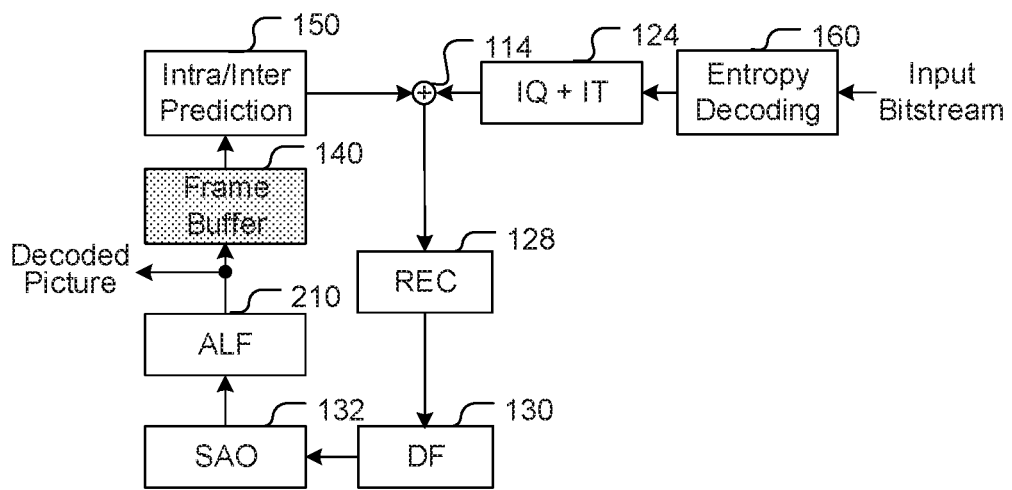
FIG. 2B illustrates an exemplary adaptive Intra/Inter video decoder similar to that in FIG. 1B with an additional ALF process.

One method is disclosed to utilize NN (e.g. CNN) as an image restoration method in a video coding system. For example, as shown in FIGS. 2A and 2B, NN on ALF output picture and generate the final decoded picture. Alternatively, the NN can be directly applied after SAO, DF, or REC in the video coding system in FIG. 1A/1B or FIG. 2A/2B with or without other restoration methods. In another embodiment, the NN can be used to restore the quantization error directly or only to improve the predictor quality. In the former case, the NN is applied after inverse quantization and transform to restore the reconstructed residual. In the latter case, the NN is applied on the predictors generated by Inter or Intra prediction.

When NN is applied to video coding, different colour components can be processed jointly or independently. For example, in one embodiment, different NNs for different colour components can be applied independently. Therefore, there can be a total of three NNs for three colour components in one video coding system. In another embodiment, there are two NNs in one video coding system, one is designed for the luma component and the other is designed for the chroma component. In the NN designed for the chroma component, U and V can be processed independently or jointly. When U and V are processed independently, the NN outputs one colour component at one time and the NN parameters are shared for U and V components. If U and V can be processed jointly, the inputs of this NN include U and V components and this NN generates U and V data simultaneously. In another embodiment, there is only one NN in the video coding system, where the inputs of NN are three colour components at the same time, and the outputs are also three colour components.

In another embodiment, the inputs of NN designed for the luma component can be the luma component only or the luma component with corresponding chroma parts. The inputs of NN designed for the chroma component can be the chroma component only or the chroma component with the corresponding luma part. Furthermore, if the YUV sampling ratios are different for different colour components, sub-sampling or up-sampling filters can be used to generate the corresponding parts. For example, when the video format is YUV420, the inputs of the NN designed for the luma components include the luma component and the up-sampled chroma data. Alternatively, the inputs of the NN designed for the luma components include the down-sampled luma data and the original chroma data. In the NN designed for the chroma components, the inputs may include two chroma components and the down-sampled luma data.

When one NN processes more than one colour component simultaneously, control flags for enabling or disabling the NN for different colour components can be combined or shared by these components. For example, if the NN processes two chroma components at the same time, one on/off flag can be coded and shared by the U and V components. In another embodiment, if the NN processes three colour components simultaneously, one on/off flag can be coded and shared by three colour components.

When the NN is applied to video coding, one colour component can be one input component of the NN. Alternative, one colour component can be further partitioned into several subblocks and each subblock is one input component of NN. For example, the size of the current region processed by the NN is M×N pixels. If one colour component is one input component of NN, the input of NN can be one component with M×N pixels in one embodiment. In another embodiment, the current region can be partitioned into four subblocks with size equal to (M/2)×(N/2), where these subblocks are generated by subsampling with four different phases. In the NN process, each subblock is one kind of input components, so the inputs of NN include four components and the size of each component is only (M/2)×(N/2) pixels.

In some NN architectures, the inputs of the NN designed for the luma component can include the luma component with corresponding chroma parts. The inputs of NN designed for the chroma component can include the chroma component with corresponding luma part. When the YUV sampling ratios are different for different colour components, different colour components can be processed to cause the block sizes of different input components be equal. For example, when the video format is YUV420, the inputs of the NN designed for the luma component can include the luma component and the chroma components. The luma component is partitioned into four subblocks based on the sampling ratio between the luma and chroma components. Therefore, one subblock of the Y component with the same size as the U or V component is one input component of NN. Therefore, there are four input components for four luma subblocks and two input components for U and V components in the NN designed for the luma component. The sizes of these six input components are the same. If more than one type of data in one colour component is used, this proposed method can be applied to all types of data or one of them. For example, for one colour component, the predictor, residual, and reconstructed pixels can be used as the inputs of NN. The proposed methods can be used to partition all types of data into four subblocks separately, so that the number of inputs of NN is increased from 3 components with size equal to M×N in one component to 3×4=12 components with size equal to (M/2×N/2) in each component. In another example, only the blocks of one type of data (e.g. the reconstructed pixels) are partitioned into four subblocks and the other two types of data are down-sampled by a factor of two in the horizontal and vertical directions. The number of inputs of NN is then increased from 3 components with size equal to M×N in each component to six components with size equal to (M/2×N/2) in each component.

In the above method, the NN mentioned can be any NN variations, such as CNN (convolutional neural network), DNN (deep fully-connected feed-forward neural network), RNN (recurrent neural network), or GAN (generative adversarial network).

Figure 3:
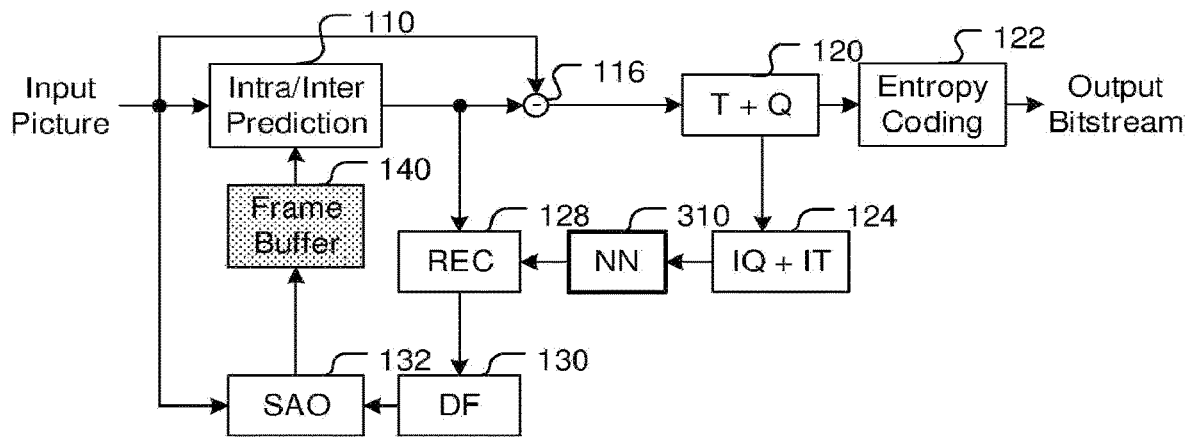
FIG. 3 illustrates an example of applying the neural network (NN) to the reconstructed residual providing the NN-filtered residual to the reconstruction module to generate reconstructed signal.

According to one embodiment, the input of NN can be single or multiple inputs. The input of NN can be the residual, predictor, reconstructed pixels, or any combination of these items. For example, as shown in FIG. 3, the NN 310 is applied to reconstructed residual from IQ+IT 124. In other words, the residual is used as the input of NN and the output of NN is the NN-filtered residual. The NN-filtered residual is then provided to the reconstruction module (i.e., REC 128) to generate reconstructed signal. FIG. 3 is an example of applying the NN 310 in a video encoder, however, the NN 310 can be applied in a corresponding video decoder in the similar way.

Figure 4:
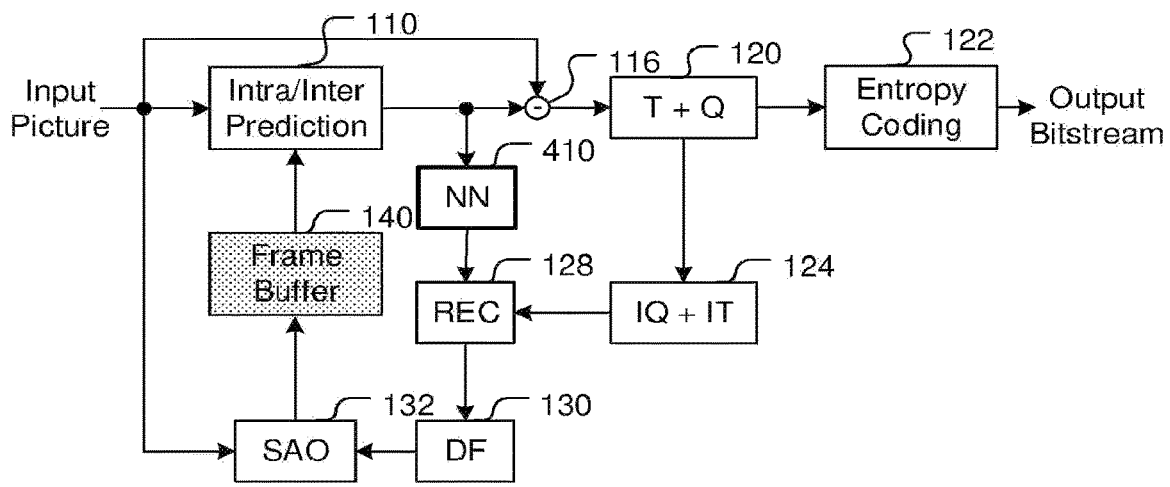
FIG. 4 illustrates an example to apply the neural network (NN) to the predictor, where the input of NN is the predictor from Intra/Inter Prediction unit and the output of NN is the NN-filtered predictor.

FIG. 4 shows an example to apply the NN 410 to the predictor. In this case, the input of NN is the predictor from Intra/Inter Prediction unit 110 and the output of NN is the NN-filtered predictor. The NN-filtered predictor residual is then provided to the reconstruction module (i.e., REC 128) to generate reconstructed signal. FIG. 4 is an example of applying the NN 410 in a video encoder; however, the NN 410 can be applied in a corresponding video decoder in the similar way.

Figure 5:
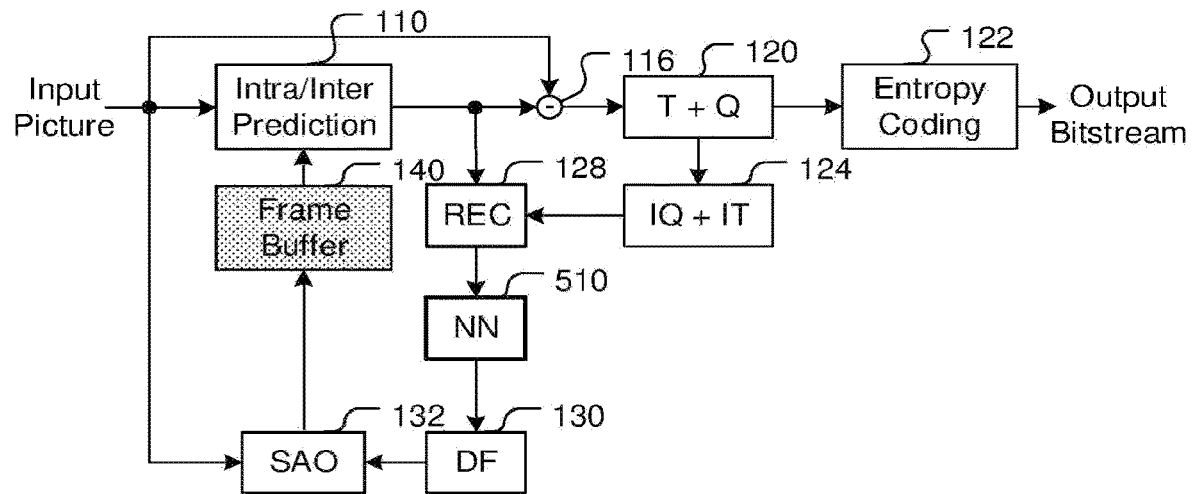
FIG. 5 illustrates an example of applying the neural network (NN) to the reconstructed signal, where the input of NN is reconstructed pixels from the reconstruction module (REC) and the output of NN is the NN-filtered reconstructed pixels.

FIG. 5 illustrates an example of applying NN 510 to the reconstructed signal. In FIG. 5, the input of NN 510 is reconstructed pixels from REC 128. The output of NN is the NN-filtered reconstructed pixels, which can be further processed by de-blocking filter (i.e., DF 130). FIG. 5 is an example of applying the NN 510 in a video encoder; however, the NN 510 can be applied in a corresponding video decoder in the similar way.

Figure 6:
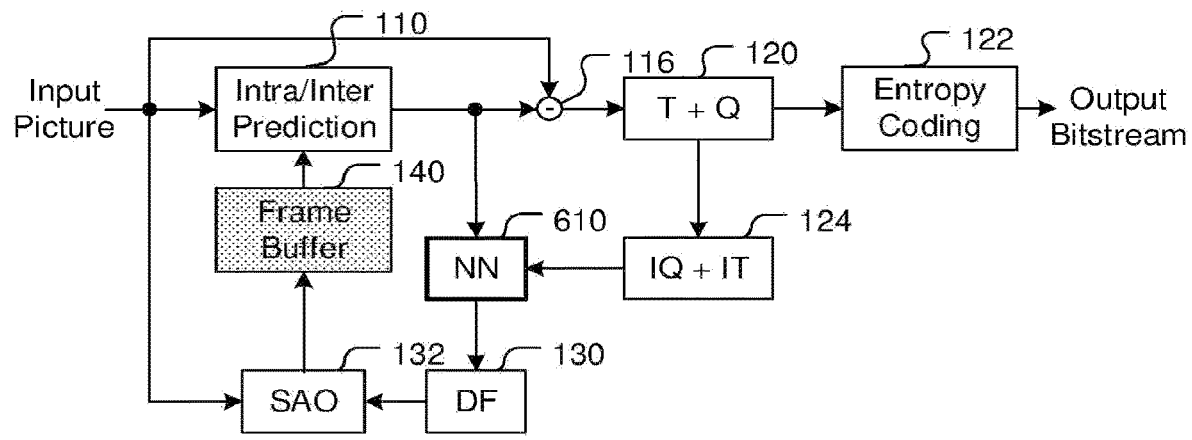
FIG. 6 illustrates an example of multiple-input neural network (NN), where two types of input signals are used for the NN including the predictor and residual and the outputs of NN are the NN-filtered reconstructed pixels.

FIG. 6 illustrates an example of multiple-input NN 610, where two types of input signals are used for the NN. FIG. 6 shows the example that the NN has multiple inputs including the predictor (i.e., the signal from Intra/Inter Predictor unit 110) and residual (i.e., the signal from IQ+IT 124). The outputs of NN are the NN-filtered reconstructed pixels, which can be further processed by de-blocking filter (i.e., DF 130). FIG. 6 is an example of applying the NN 610 in a video encoder, however, the NN 610 can be applied in a corresponding video decoder in the similar way.

Figure 7:
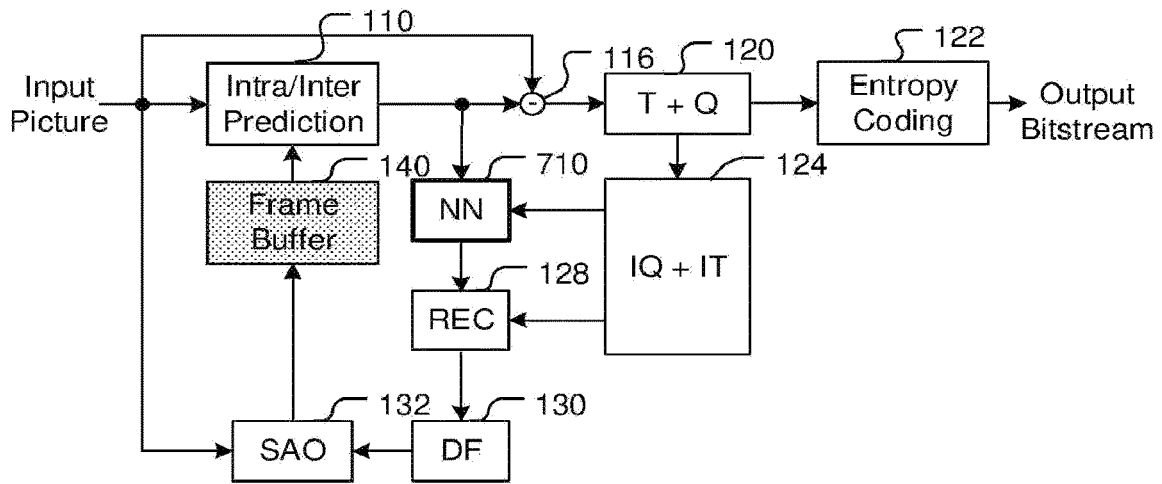
FIG. 7 illustrates another example of multiple-input neural network (NN), where the NN has multiple inputs including the predictor and residual and the outputs of NN are the NN-filtered predictor.

FIG. 7 illustrates another example of multiple-input NN 710, which is similar to the system in FIG. 6. In FIG. 7, the NN has multiple inputs including the predictor (i.e., the signal from Intra/Inter Predictor unit 110) and residual (i.e., the signal from IQ+IT 124). However, the NN generates the NN-filtered predictor, instead of NN-filtered reconstructed pixels as shown in FIG. 6. The NN-filtered predictor is then provided to the reconstruction module (i.e., REC 128) to generate reconstructed signal. FIG. 7 is an example of applying the NN 710 in a video encoder; however, the NN 710 can be applied in a corresponding video decoder in the similar way.

Figure 8:
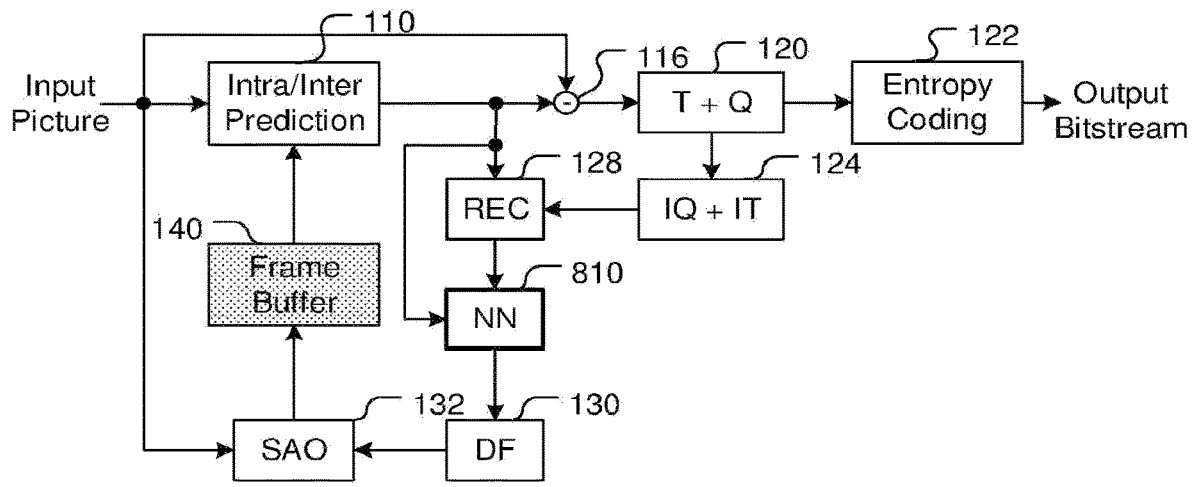
FIG. 8 illustrates yet another example of two-input neural network (NN), where the multiple inputs of NN include the predictor and reconstructed pixels and the outputs of NN are NN-filtered reconstructed pixels.

FIG. 8 illustrates yet another example of two-input NN 810. In FIG. 8, the multiple inputs of NN include the predictor (i.e., the signal from Intra/Inter Predictor unit 110) and reconstructed pixels from REC 128. The outputs of NN are NN-filtered reconstructed pixels, which can be further processed by de-blocking filter (i.e., DF 130). FIG. 8 is an example of applying the NN 810 in a video encoder, however, the NN 810 can be applied in a corresponding video decoder in the similar way.

Figure 9:
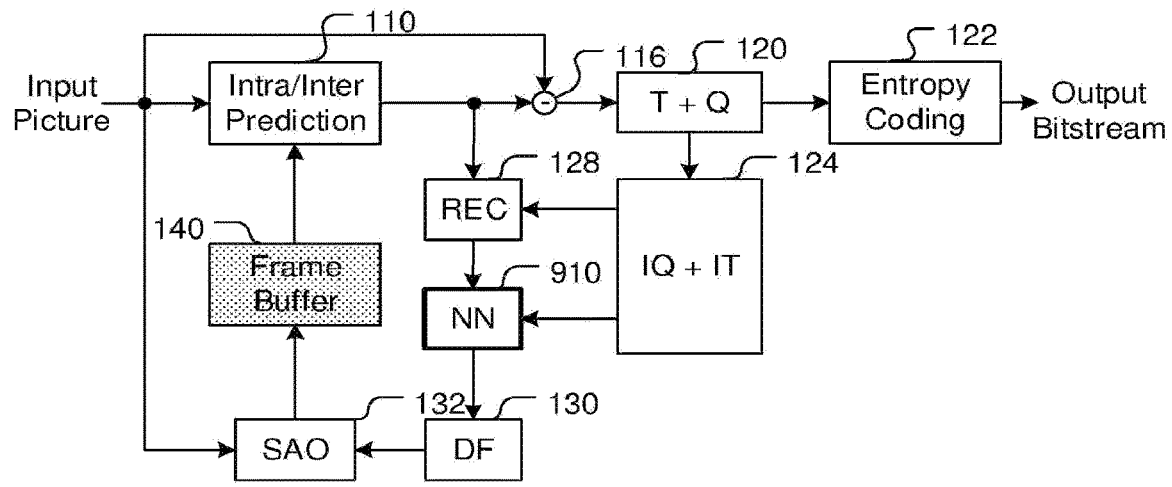
FIG. 9 illustrates yet another example of two-input neural network (NN), where the multiple inputs of NN include the residual and the reconstructed pixels and the outputs of NN are NN-filtered reconstructed pixels.

FIG. 9 illustrates yet another example of two-input NN 910. In FIG. 9, the multiple inputs of NN include the residual (i.e., the signal from IQ+IT 124) and the reconstructed pixels from REC 128. The outputs of NN are NN-filtered reconstructed pixels, which can be further processed by de-blocking filter (i.e., DF 130). FIG. 9 is an example of applying the NN 910 in a video encoder; however, the NN 910 can be applied in a corresponding video decoder in the similar way.

Figure 10:
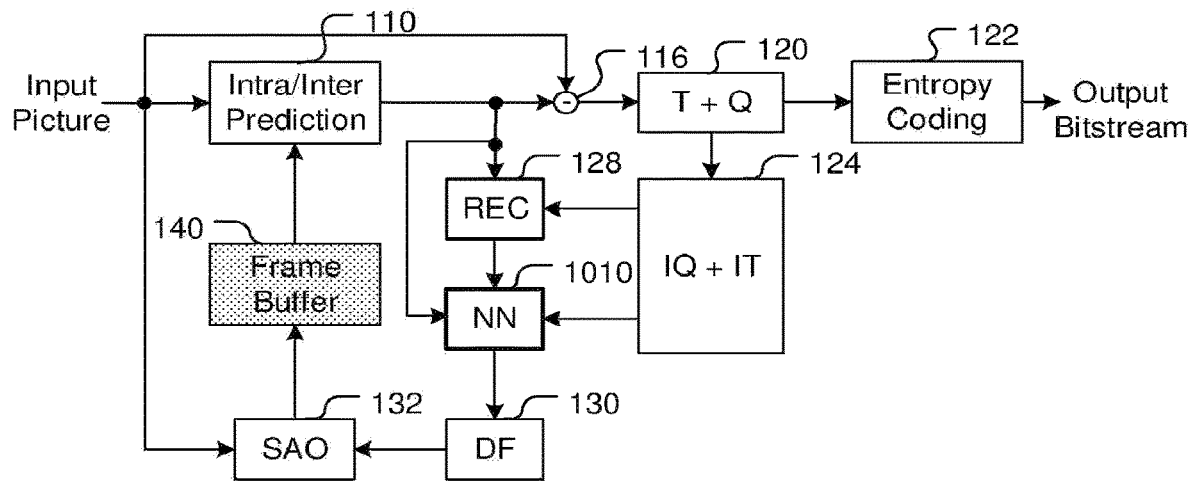
FIG. 10 illustrates yet another example of two-input neural network (NN), where the multiple inputs of NN include the predictor, the residual and the reconstructed pixels and the outputs of NN are NN-filtered reconstructed pixels.

FIG. 10 illustrates yet another example of three-input NN 1010. In FIG. 10, the multiple inputs of NN include the predictor (i.e., the signal from Intra/Inter Predictor unit 110), the residual (i.e., the signal from IQ+IT 124) and the reconstructed pixels from REC 128. The outputs of NN are NN-filtered reconstructed pixels, which can be further processed by de-blocking filter (i.e., DF 130). FIG. 10 is an example of applying the NN 1010 in a video encoder; however, the NN 1010 can be applied in a corresponding video decoder in the similar way.

For the above cases in which reconstructed pixels is the single input or one of the multiple inputs of NN, based on the position of NN at the encoder and decoder, the input reconstructed pixels can be from different modules. For example, in FIG. 5, FIG. 8, FIG. 9 and FIG. 10, since NN is applied right after REC 128 and prior to DF 130, the reconstructed pixels as the input of NN are from REC 128. Since the NN can be applied after REC 128, DF 130, SAO 132 or ALF 210 (in FIG. 2A/2B), the reconstructed inputs can be from REC 128, DF 130, SAO 132, or ALF 210, accordingly. In the above drawings, only the system block diagrams for the encoder side are shown. The system block diagrams for the decoder side can be derived according.

Methods to use the NN for encoding mode decision are also disclosed. In one embodiment, deep learning is used to decide the coding structure. In HEVC, one slice is partitioned into multiple CTUs. The CTU is further partitioned into multiple CUs to adapt to various local characteristics. A quad-tree denoted as the coding tree is used to partition the CTU into multiple CUs. According to this embodiment, the deep learning network will output the quad-tree decision (e.g. split or no split) for a given block. For the next-generation video coding standard, other coding tree partitions (e.g. QTBT (Quad Tree Binary Tree) and TT (Ternary Tree) partitions) have been proposed to improve the coding performance. In another embodiment, the deep learning network will output the tree partition decisions for a given block (e.g. QT or BT, horizontal BT or vertical BT, BT or TT, horizontal TT or vertical TT).

In another embodiment, deep learning is used to decide the Intra or Inter mode. The deep learning network will output the Intra or Inter mode decisions for a given block.

In another embodiment, deep learning is used to decide the Intra mode for the luma component. In HEVC, there are 35 Intra modes for the luma component, including DC, planar and angular modes. For the next-generation video coding standard, more Intra modes (e.g. 67 modes) are proposed to improve the coding performance. The deep learning network will output the luma Intra mode for a given block.

In another embodiment, deep learning is used to decide the Intra mode for the chroma component. In HEVC, there are 5 Intra modes for the chroma component, including DM, DC, planar, vertical and horizontal modes. For the next-generation video coding standard, additional chroma modes (e.g. LM mode and other fusion modes) can be added. The deep learning network will output the chroma Intra mode for a given block.

In another embodiment, deep learning is used to decide the Merge or AMVP (advanced motion vector prediction) modes for the Inter mode. The Merge and AMVP mode for Inter prediction are known in the field and the details are not repeated here. The deep learning network will output the Merge or AMVP decisions for a given block.

In another embodiment, deep learning is used to decide the Merge candidate for the Inter mode. In HEVC, there are both spatial and temporal Merge candidates. For the next-generation video coding standard, additional Merge candidates (e.g. Affine Merge Candidate) can be added, or additional decode side operations (e.g. Pattern-Based Motion Vector Derivation (PMVD), Decoder-side Motion Vector Refinement (DMVR)) can be performed in order to refine the Merge candidate. The deep learning network will output the Merge candidate and the refinement decisions for a given block.

In another embodiment, deep learning is used to decide motion vector resolutions for the Inter mode. In HEVC, there is only quarter-pel motion vector resolution. For the next-generation video coding standard, additional resolutions (e.g. integer-pel or 4-pel) can be added. The deep learning network will output the motion vector resolution for a given block.

In another embodiment, deep learning is used to decide the multiple core transforms for the block. In HEVC, DCT-II or DST can be used as core transform. For the next-generation video coding standard, additional core transforms (e.g. DCT-IV, DCT-VII, DCT-VIII) can be added. The deep learning network will output the core transform decisions for a given block.

In another embodiment, deep learning is used to decide the multiple secondary transforms for the block. For the next-generation video coding standard, additional secondary transforms can be added. The deep learning network will output the secondary transform decisions for a given block.

In another embodiment, deep learning is used to decide the quantization parameters for the block. In HEVC, as well as in various advanced video coding systems, quantization is introduced to achieve trade-off between distortion and bitrate for the rate control. The deep learning network will output the quantization parameters for a given block.

In another embodiment, deep learning is used to decide the deblocking parameters for the block. The deep learning network will output the deblocking parameters for a given block.

In another embodiment, deep learning is used to decide the SAO type for the block. The deep learning network will output the SAO type for a given block.

In another embodiment, deep learning is used to decide the modified reconstructed pixels for a given block. The deep learning network will output the modified reconstructed pixels for a given block.

Among all the embodiments related to encoding decision disclosed above, the input to the deep learning network can be the uncompressed source for the block, or reconstructed pixels from the spatial or temporal frames, or any information (e.g. source variance, histograms, gradient, motion field, predictions and residuals) can be acquired or generated during the encoding process.

Among all the embodiments related to encoding decision disclosed above, the output can also contain confidence values about the decisions to indicate how trustable of the decisions made by the deep learning network.

Figure 11:
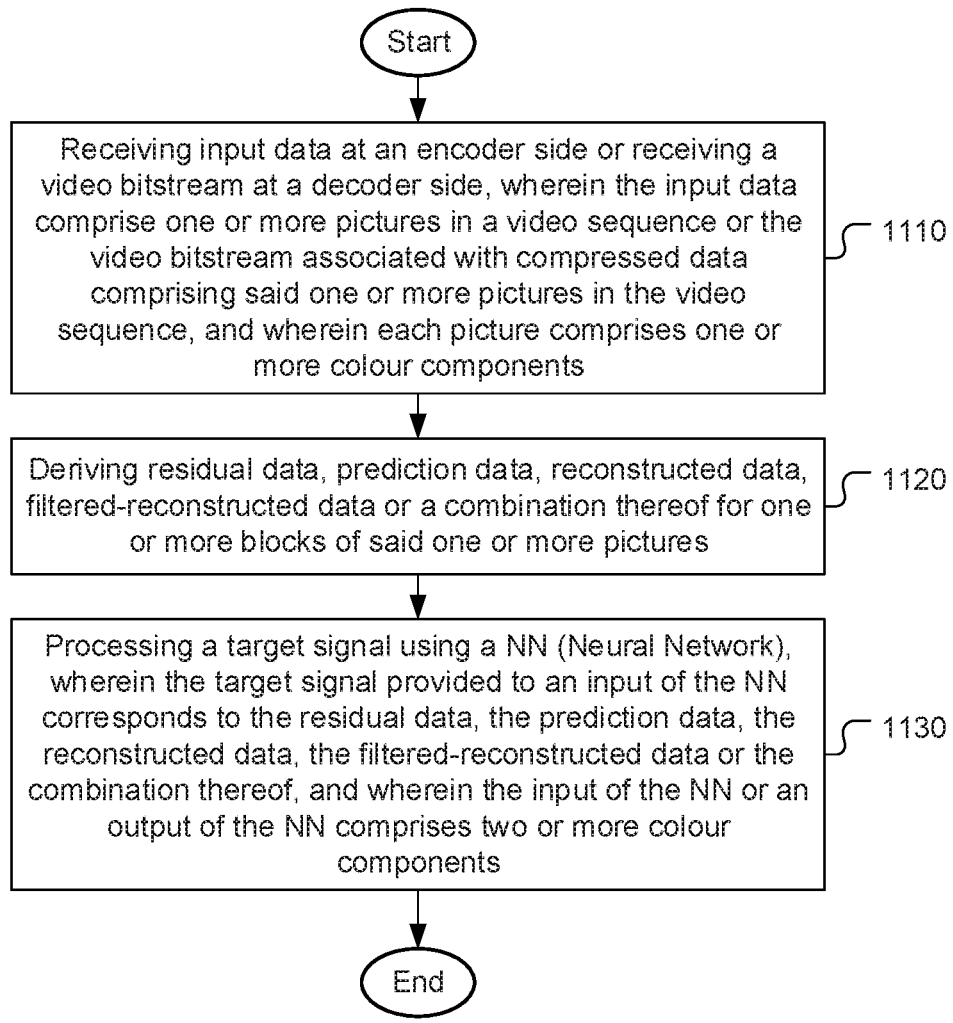
FIG. 11 illustrates an exemplary flowchart of video coding for a video encoder or decoder incorporating the neural network (NN) according to one embodiment of the present invention.

FIG. 11 illustrates an exemplary flowchart of video coding for a video encoder or decoder incorporating the neural network (NN) according to one embodiment of the present invention. The steps shown in the flowchart may be implemented as program codes executable on one or more processors (e.g., one or more CPUs) at an encoder side or decoder side. The steps shown in the flowchart may also be implemented based hardware such as one or more electronic devices or processors arranged to perform the steps in the flowchart. The method receives input data at an encoder side or receiving a video bitstream at a decoder side in step 1110, where the input data comprise one or more pictures in a video sequence or the video bitstream comprises compressed data associated with said one or more pictures in the video sequence, and wherein each picture comprises one or more colour components. Residual data, prediction data, reconstructed data, filtered-reconstructed data or a combination thereof is derived for one or more blocks of said one or more pictures in step 1120. A target signal is processed using a NN (Neural Network) in step 1130, where the target signal provided to an input of the NN corresponds to the residual data, the prediction data, the reconstructed data, the filtered-reconstructed data or the combination thereof, and the input of the NN or an output of the NN comprises two or more colour components.

Figure 12:
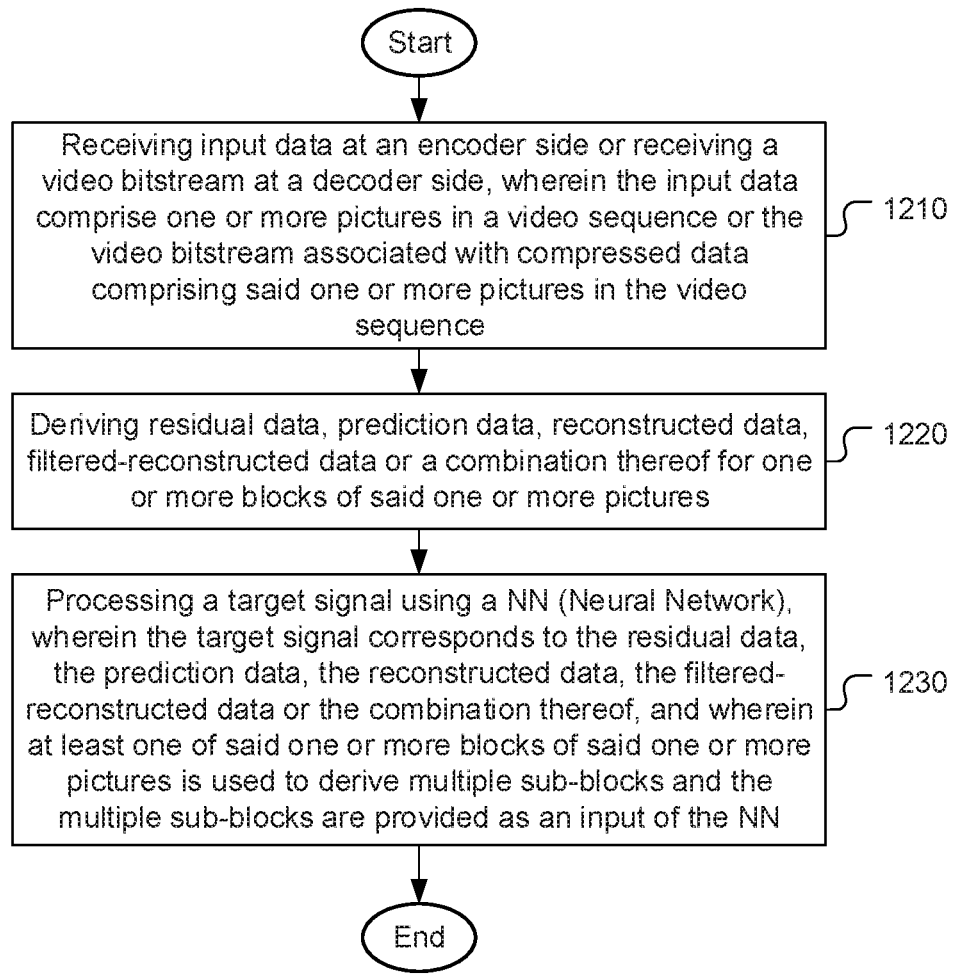
FIG. 12 illustrates an exemplary flowchart of video coding for a video encoder or decoder incorporating the neural network (NN) according to one embodiment of the present invention.

FIG. 12 illustrates an exemplary flowchart of video coding for a video encoder or decoder incorporating the neural network (NN) according to one embodiment of the present invention. The method receives input data at an encoder side or receiving a video bitstream at a decoder side in step 1210, where the input data comprise one or more pictures in a video sequence or the video bitstream comprises compressed data associated with said one or more pictures in the video sequence. Residual data, prediction data, reconstructed data, filtered-reconstructed data or a combination thereof is derived for one or more blocks of said one or more pictures in step 1220. A target signal is processed using a NN (Neural Network) in step 1230, where the target signal provided to an input of the NN corresponds to the residual data, the prediction data, the reconstructed data, the filtered-reconstructed data or the combination thereof, and at least one of said one or more blocks of said one or more pictures is used to derive multiple sub-blocks and the multiple sub-blocks are provided as an input of the NN.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for a video encoder or decoder, the method comprising:
   receiving input data at an encoder side or receiving a video bitstream at a decoder side, wherein the input data correspond to a picture in a video sequence or the video bitstream comprises compressed data associated with the picture in the video sequence;
   deriving residual data and prediction data for a block of the picture based on the input data or the compressed data;
   generating reconstructed data for the block by combining the residual data and the prediction data for the block;
   performing a NN (Neural Network) process to generate filtered reconstructed data for the block according to inputs of the NN that include, provided as separate input channels of the inputs:
      (i) the reconstructed data for the block, and
      (ii) the residual data or the prediction data for the block; and
   generating reconstructed picture data of the picture based on the filtered reconstructed data for the block.

2. The method of claim 1, wherein the NN process is configured to generate two chroma components of the filtered reconstructed data for the block.

3. The method of claim 1, wherein
   the NN process is configured to generate a luma component of the filtered reconstructed data for the block according to the inputs of the NN that include a luma component of the reconstructed data for the block and a chroma component of the reconstructed data for the block, and
   the chroma component of the reconstructed data for the block is up-sampled to match a sampling rate of the luma component of the reconstructed data for the block.

4. The method of claim 1, wherein the NN process is configured to generate one luma component of the filtered reconstructed data for the block and two chroma components of the filtered reconstructed data for the block.

5. The method of claim 1, wherein
the NN process is configured to generate a chroma component of the filtered reconstructed data for the block according to the inputs of the NN that include a chroma component of the reconstructed data for the block and a luma component of the reconstructed data for the block, and
the luma component of the reconstructed data for the block is down-sampled to match a sampling rate of the chroma component of the reconstructed data for the block.

6. The method of claim 1, wherein the NN corresponds to CNN (convolutional neural network), DNN (deep fully-connected feed-forward neural network), RNN (recurrent neural network), or GAN (generative adversarial network).

7. The method of claim 1, wherein
the NN process is configured to generate two or more color components of the filtered reconstructed data for the block, and
the method further comprises determining a shared control flag indicative of enabling the NN process for the two or more color components of the filtered reconstructed data for the block.

8. An apparatus for video coding in a video encoder or decoder, the apparatus comprising one or more electronics or processors configured to:
receive input data at an encoder side or receive a video bitstream at a decoder side, wherein the input data correspond to a picture in a video sequence or the video bitstream comprises compressed data associated with the picture in the video sequence;
derive residual data and prediction data for a block of the picture based on the input data or the compressed data;
generate reconstructed data for the block by combining the residual data and the prediction data for the block;
perform a NN (Neural Network) process to generate filtered reconstructed data for the block according to inputs of the NN that include, provided as separate input channels of the inputs:
(i) the reconstructed data for the block, and
(ii) the residual data or the prediction data for the block; and
generate reconstructed picture data of the picture based on the filtered reconstructed data for the block.

9. A method of video coding for a video encoder or decoder, the method comprising:
receiving input data at an encoder side or receiving a video bitstream at a decoder side, wherein the input data correspond to a picture in a video sequence or the video bitstream comprises compressed data associated with the picture in the video sequence;
deriving residual data and prediction data for a block of the picture based on the input data or the compressed data;
generating reconstructed data for the block by combining the residual data and the prediction data for the block;
deriving pieces of data corresponding to respective portions of the block from a color component of the reconstructed data for the block;
performing a NN (Neural Network) process to generate filtered reconstructed data for the block according to inputs of the NN that include at least the pieces of data as separate input channels of the inputs of the NN; and
generating reconstructed picture data of the picture based on the filtered reconstructed data for the block.

10. The method of claim 9, wherein the portions of the block correspond to subsampling the block according to different phases.

11. The method of claim 9, wherein the NN corresponds to CNN (convolutional neural network), DNN (deep fully-connected feed-forward neural network), RNN (recurrent neural network), or GAN (generative adversarial network).

12. The method of claim 9, wherein
the NN process is configured to generate a luma component of the filtered reconstructed data for the block according to the inputs of the NN that include a luma component of the reconstructed data for the block and a chroma component of the reconstructed data for the block, and
the chroma component of the reconstructed data for the block is up-sampled to match a sampling rate of the luma component of the reconstructed data for the block.

13. The method of claim 9, wherein
the color component of the reconstructed data for the block corresponds to a luma component of the reconstructed data for the block, and
the NN process is configured to output a luma component of the filtered reconstructed data for the block in data pieces that correspond to the respective portions of the block.

14. The method of claim 9, wherein the NN process is configured to output more than one color components of the filtered reconstructed data for the block,
the color component of the reconstructed data for the block corresponds to a luma component of the reconstructed data for the block,
the inputs of the NN further include a chroma component of the reconstructed data for the block as another input channel of the inputs of the NN, and
the NN process is configured to output (i) a chroma component of the filtered reconstructed data for the block and (ii) a luma component of the filtered reconstructed data for the block in data pieces that correspond to the respective portions of the block.

15. The method of claim 9, wherein
the NN process is configured to generate a chroma component of the filtered reconstructed data for the block according to the inputs of the NN that include a chroma component of the reconstructed data for the block and a luma component of the reconstructed data for the block, and
the luma component of the reconstructed data for the block is down-sampled to match a sampling rate of the chroma component of the reconstructed data for the block.

16. The method of claim 9, wherein the inputs of the NN further include the residual data or the prediction data for the block.

17. An apparatus for video coding in a video encoder or decoder, the apparatus comprising one or more electronics or processors configured to:
receive input data at an encoder side or receiving a video bitstream at a decoder side, wherein the input data correspond to a picture in a video sequence or the video bitstream comprises compressed data associated with the picture in the video sequence;
derive residual data and prediction data for a block of the picture based on the input data or the compressed data;

generate reconstructed data for the block by combining the residual data and the prediction data for the block;

derive pieces of data corresponding to respective portions of the block from a color component of the reconstructed data for the block;

perform a NN (Neural Network) process to generate filtered reconstructed data for the block according to inputs of the NN that include at least the pieces of data as separate input channels of the inputs of the NN; and generate reconstructed picture data of the picture based on the filtered reconstructed data for the block.

18. The apparatus of claim 17, wherein the inputs of the NN further include the residual data or the prediction data for the block.

* * * * *